United States Patent
Ishikawa et al.

(10) Patent No.: US 9,767,391 B2
(45) Date of Patent: Sep. 19, 2017

(54) CARD READER

(71) Applicant: NIDEC SANKYO CORPORATION, Suwa-gun, Nagano (JP)

(72) Inventors: Kazutoshi Ishikawa, Nagano (JP); Kazunori Takahashi, Nagano (JP)

(73) Assignee: NIDEC SANKYO CORPORATION, Suwa-Gun, Nagano (JP)

( * ) Notice: Subject to any disclaimer, the term of this patent is extended or adjusted under 35 U.S.C. 154(b) by 14 days.

(21) Appl. No.: 15/024,955

(22) PCT Filed: Apr. 14, 2014

(86) PCT No.: PCT/JP2014/060571
§ 371 (c)(1),
(2) Date: Mar. 25, 2016

(87) PCT Pub. No.: WO2015/045458
PCT Pub. Date: Apr. 2, 2015

(65) Prior Publication Data
US 2016/0259997 A1    Sep. 8, 2016

(30) Foreign Application Priority Data

Sep. 26, 2013 (JP) ................................. 2013-199650

(51) Int. Cl.
*G06K 7/08* (2006.01)
*G06K 13/08* (2006.01)

(52) U.S. Cl.
CPC ......... *G06K 13/0881* (2013.01); *G06K 7/082* (2013.01); *G06K 7/087* (2013.01); *G06K 13/0831* (2013.01); *G06K 13/0875* (2013.01)

(58) Field of Classification Search
CPC ...... G06K 7/084; G06K 7/087; G07F 7/1008; G07F 19/20; G06Q 20/341; G06Q 20/1085

(Continued)

(56) References Cited

U.S. PATENT DOCUMENTS 4,581,523 A * 4/1986 Okuno ................... G06K 7/084
                                                              235/449
8,418,917 B1 * 4/2013 Lewis .................... G06K 13/08
                                                              235/379

(Continued)

FOREIGN PATENT DOCUMENTS

EP    2624227 A1    8/2013
JP    H09128872 A   5/1997

(Continued)

OTHER PUBLICATIONS

International Search Report corresponding to Application No. PCT/JP2014/060571; Date of Mailing: Jun. 17, 2014, with English translation.

*Primary Examiner* — Karl D Frech
(74) *Attorney, Agent, or Firm* — Cantor Colburn LLP

(57) ABSTRACT

A card reader may include a card conveying mechanism; a guide; a magnetic head; a positioning member to position the card relative to the magnetic head; and a shutter. The positioning member may include a card abutting part to abut a third direction end of the card; and a card support part to contact a first direction side of the card. A distance between the card abutting part and a third direction end of the guide is shorter than a width in the short-side direction of the card. When the shutter has closed, a fourth direction end of the shutter is disposed on a first direction side of the guide. When the shutter has opened the opening, the shutter is disposed on the first direction side of the guide. The third direction end of the card may be guided to the card support part by the shutter.

7 Claims, 10 Drawing Sheets

(58) Field of Classification Search
USPC .................................... 235/449, 380, 379
See application file for complete search history.

(56) References Cited

U.S. PATENT DOCUMENTS

| | | | | |
|---|---|---|---|---|
| 8,474,700 | B1* | 7/2013 | Lewis | G06Q 10/00 |
| | | | | 235/379 |
| 8,690,052 | B1* | 4/2014 | Lewis | G06K 13/08 |
| | | | | 235/379 |
| 9,038,891 | B2* | 5/2015 | Lewis | G07F 19/201 |
| | | | | 235/379 |
| 9,038,904 | B2* | 5/2015 | Ishikawa | G11B 5/00808 |
| | | | | 235/440 |
| 9,129,204 | B2* | 9/2015 | Ishikawa | G06K 13/0881 |
| 9,378,629 | B2* | 6/2016 | Lewis | G06K 7/084 |

FOREIGN PATENT DOCUMENTS

| | | |
|---|---|---|
| JP | 2007293387 A | 11/2007 |
| JP | 2013164675 A | 8/2013 |
| WO | 2013118538 A1 | 8/2013 |

\* cited by examiner

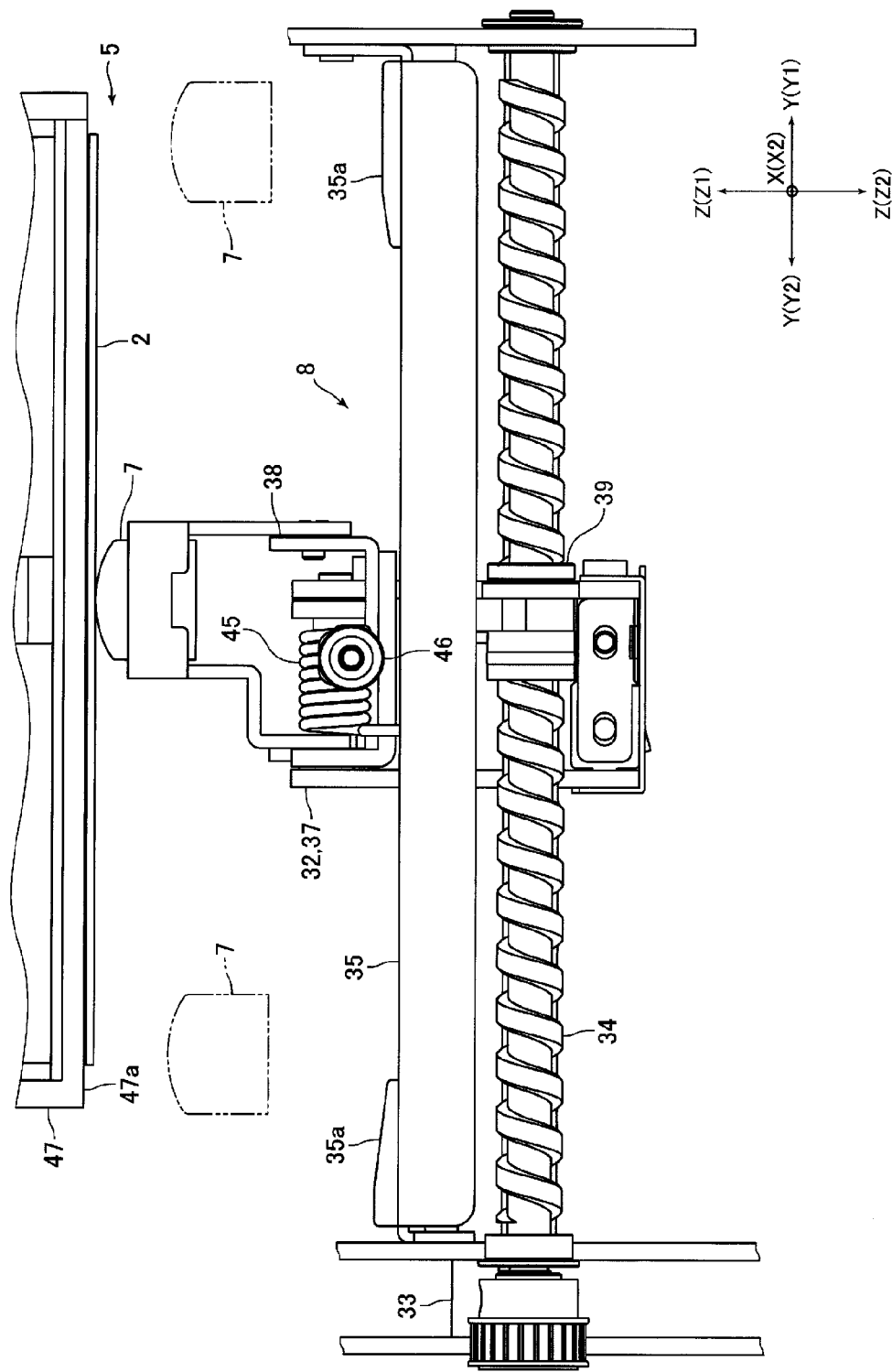

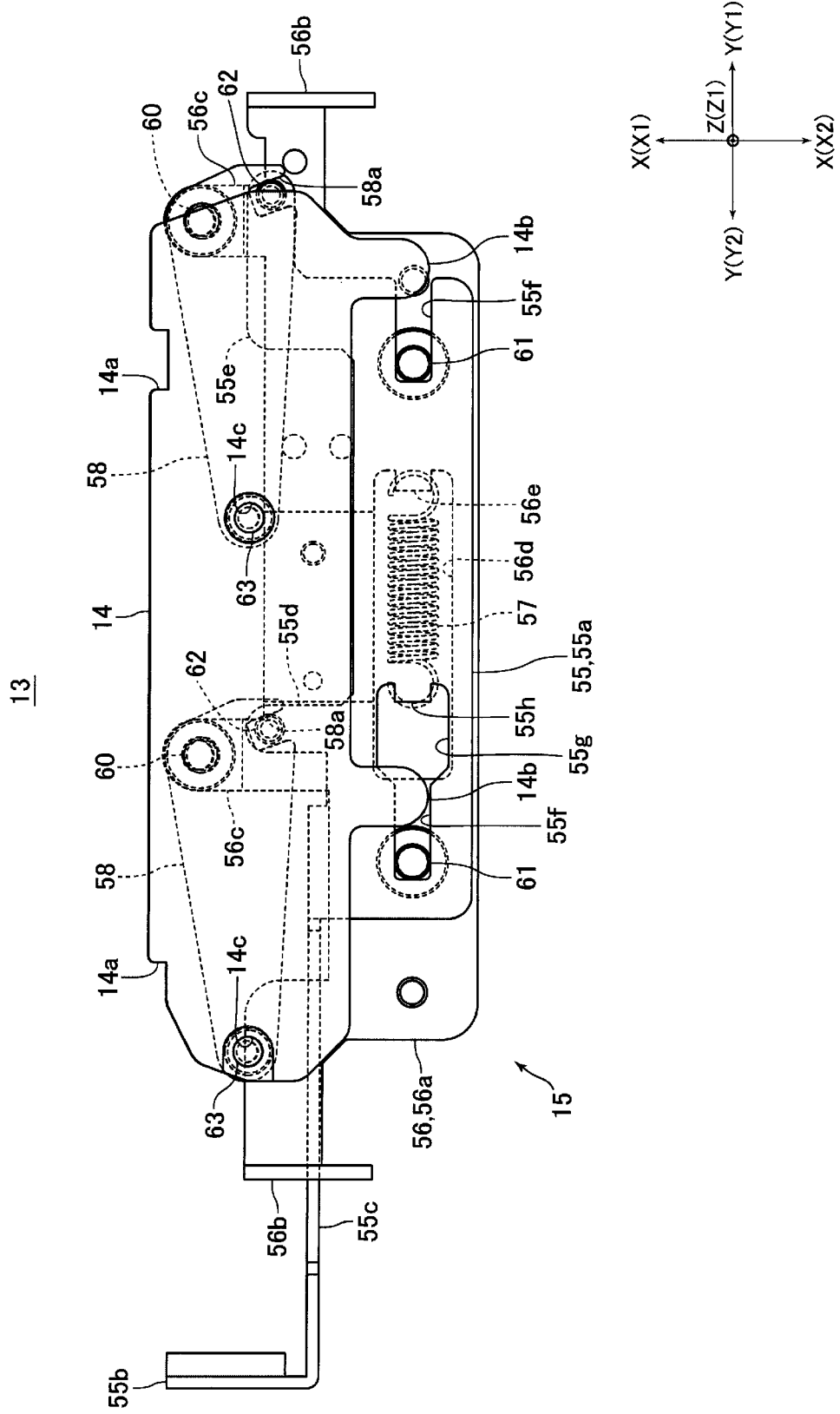

Fig. 10(A)
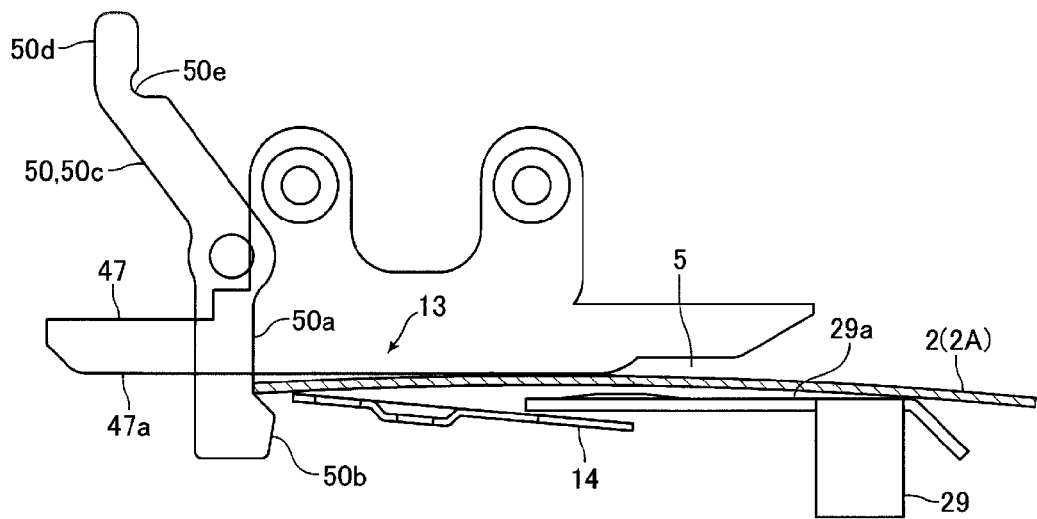
Fig. 10(B)
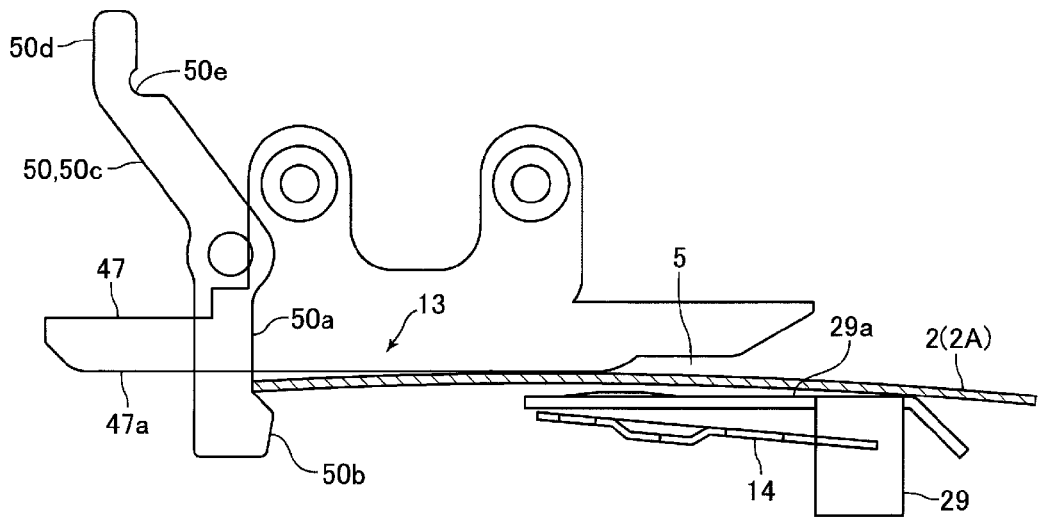
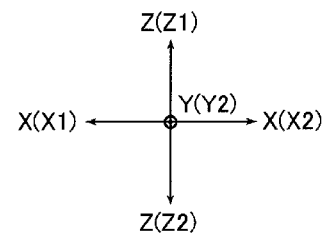

CARD READER

CROSS REFERENCE TO RELATED APPLICATIONS

This is the U.S. national stage of application No. PCT/JP2014/060571, filed on Apr. 14, 2014. Priority under 35 U.S.C. §119(a) and 35 U.S.C. §365(b) is claimed from Japanese Application No. 2013-199650, filed Sep. 26, 2013; the disclosure of which is incorporated herein by reference.

FIELD OF THE INVENTION

The present invention relates to a card reader in which a card formed in a substantially rectangular shape is conveyed in its short-side direction and processed.

BACKGROUND

Conventionally, a card reader in which a card with a magnetic stripe in conformity with the international standard or JIS standard (in other words, a card formed in a substantially rectangular shape) is conveyed in its short-side direction and processed has been proposed by the present inventors (see, for example, Patent Literature 1). The card reader described in Patent Literature 1 includes a card conveying mechanism structured to convey a card, a magnetic head structured to abut with the card and perform reading of magnetic data recorded on the card and recording of magnetic data to the card, a head moving mechanism structured to move the magnetic head in a direction perpendicular to a conveying direction of the card, and a positioning member structured to position the card having been taken into the card reader. The positioning member is formed with an abutting part structured to abut with a rear end of the card having been taken into the card reader. Further, in the card reader, a card conveying passage where a card is conveyed is formed with an opening part structured to pass the magnetic head which is moved in a direction perpendicular to the conveying direction of the card.

Conventionally, a magnetic head moving type medium processing device has been known in which reading of magnetic data from a magnetic stripe provided on a bankbook and recording of magnetic data to the magnetic stripe are performed (see, for example, Patent Literature 2). In a bankbook which is processed in a medium processing device described in Patent Literature 2, a magnetic stripe is formed in a direction perpendicular to a conveying direction of the bankbook and thus the medium processing device includes a magnetic head moving mechanism structured to move a magnetic head in the direction perpendicular to the conveying direction of the bankbook. An under face of a conveying passage where a bankbook is conveyed is formed with an opening part for passing the magnetic head in the direction perpendicular to the conveying direction. Further, the medium processing device includes a shutter member for closing the opening part. In the medium processing device, the opening part is closed by the shutter member for preventing an end part of the bankbook in the conveying direction from being caught by the opening part when the bankbook is conveyed.

CITATION LIST

Patent Literature

[PTL 1] Japanese Patent Laid-Open No. 2013-164675
[PTL 2] Japanese Patent Laid-Open No. 2007-293387

In the card reader described in Patent Literature 1, an opening part for passing the magnetic head is formed in the card conveying passage. Therefore, when a card is conveyed, an end part in a conveying direction of the card is caught by the opening part and, as a result, the card may be clogged in the card conveying passage. If a shutter member described in Patent Literature 2 is provided in the card reader described in Patent Literature 1, the problem may be eliminated. However, the present inventors have found that, in a case that a shutter member for closing the opening part is simply provided in the card reader described in Patent Literature 1, when a card which is deformed so that an end part in a short-side direction of the card is contacted with the shutter member is taken into the card reader, the end part in the short-side direction of the card is contacted with the shutter member and the shutter member is difficult to be opened and closed smoothly.

SUMMARY

In view of the problem described above, at least an embodiment of the present invention provides a card reader in which a card formed in a substantially rectangular shape is conveyed in its short-side direction and processed and, even when an opening part for passing the magnetic head moving in a width direction of a conveying passage is formed in a conveying passage, a shutter member for closing the opening part can be moved smoothly.

To achieve the above, at least and embodiment of the present invention provides a card reader in which a card formed in a substantially rectangular shape is conveyed in a short-side direction of the card and processed. When one side in a thickness direction of the card conveyed in the card reader is referred to as a first direction, the other side in the thickness direction of the card is referred to as a second direction, a taking-in direction of the card to the card reader which is one side in a conveying direction of the card conveyed in the card reader is referred to as a third direction, and an ejecting direction of the card from the card reader which is the other side in the conveying direction of the card is referred to as a fourth direction, the card reader includes a card conveying mechanism structured to convey the card, a guide part which structures at least a part on a first direction side of the conveying passage where the card is conveyed, a magnetic head structured to abut with a magnetic stripe formed on the card from the first direction side and perform at least one of reading of magnetic data recorded on the card and recording of magnetic data to the card, a head moving mechanism structured to move the magnetic head in a width direction of the conveying passage which is perpendicular to the conveying direction of the card, a positioning member structured to position the card with respect to the magnetic head in the conveying direction of the card, and a shutter member structured to close an opening part which is formed on the first direction side of the conveying passage. The positioning member includes a card abutting part with which a third direction end of the card is capable of abutting, and a card support part which is capable of contacting with a first direction side of the card when the third direction end of the card is abutted with the card abutting part. When the third direction end of the card is abutted with the card abutting part, the card is positioned with respect to the magnetic head in the conveying direction of the card. The opening part is formed between the positioning member and the guide part in the conveying direction of the card and is formed so that the magnetic head moving in the width direction of the conveying passage is passed. A distance between the card abutting part and a third direction end of the guide part in the conveying direction of the card is set to be shorter than a width in the short-side direction of the card. When the shutter member has closed the opening part, a fourth direction end of the shutter member is disposed on the first direction side relative to the guide part in the thickness direction of the card. When the shutter member has opened the opening part, the shutter member is disposed on the first direction side relative to the guide part in the thickness direction of the card. The third direction end of the card is capable of being guided to the card support part by the shutter member having closed the opening part.

In the card reader in at least an embodiment of the present invention, the positioning member includes a card abutting part with which a third direction end of the card is capable of abutting, and a card support part which is capable of contacting with a first direction side of the card when the third direction end of the card is abutted with the card abutting part. When the third direction end of the card is abutted with the card abutting part, the card is positioned with respect to the magnetic head in the conveying direction of the card. Further, in at least an embodiment of the present invention, the third direction end of the card is capable of being guided to the card support part by the shutter member having closed the opening part which is formed so that the magnetic head is passed. Therefore, according to at least an embodiment of the present invention, even in a case that a card (hereinafter, referred to as a "first curved card") which is curved so that both ends in a short-side direction of the card (both ends in a conveying direction of the card) are located on the first direction side (in other words, located on the shutter member side) is inserted into the card reader, when the first curved card is positioned, the third direction end of the first curved card can be supported by the card support part.

Further, in at least an embodiment of the present invention, a distance between the card abutting part and a third direction end of the guide part in the conveying direction of the card is set to be shorter than a width in the short-side direction of the card and, when the shutter member has closed the opening part, a fourth direction end of the shutter member is located on a first direction side relative to the guide part. Therefore, according to at least an embodiment of the present invention, even in a case that the first curved card is inserted into the card reader, when the first curved card is positioned, the fourth direction end of the first curved card can be supported by the guide part.

As described above, in at least an embodiment of the present invention, even in a case that the first curved card is inserted into the card reader, when the first curved card is positioned, the third direction end of the first curved card is supported by the card support part and the fourth direction end of the first curved card can be supported by the guide part. Further, in at least an embodiment of the present invention, when the shutter member has opened the opening part, the shutter member is disposed on the first direction side relative to the guide part. Therefore, in a case that a position of the shutter member when the opening part is closed is referred to as a closing position and a position of the shutter member when the opening part is opened is referred to as an open position, when the shutter member located at the closing position is to be moved toward the open position after the card is positioned for performing reading and recording of magnetic data on the positioned card by the magnetic head, the third direction end side and the fourth direction end side of the first curved card can be prevented from contacting with the shutter member or, even in a case that the third direction end side and the fourth direction end side of the first curved card are contacted with the shutter member, the contact pressure can be reduced. Further, in a case that the shutter member located at the open position is to be moved to the closing position in a state that the card is positioned, the third direction end side and the fourth direction end side of the first curved card can be prevented from contacting with the shutter member or, even in a case that the third direction end side and the fourth direction end side of the first curved card are contacted with the shutter member, the contact pressure can be reduced. Therefore, according to at least an embodiment of the present invention, in a case that the shutter member is moved between the closing position and the open position, a load to the shutter member due to contact pressure of the card can be at least reduced. As a result, in at least an embodiment of the present invention, even when the opening part for passing the magnetic head moved in the width direction of the conveying passage is formed in the conveying passage, the shutter member for closing the opening part can be moved smoothly.

In at least an embodiment of the present invention, it is preferable that the shutter member having closed the opening part is inclined with respect to the conveying direction of the card so as to go a second direction side toward the third direction. According to this structure, when the first curved card is inserted into the card reader, the third direction end of the first curved card can be surely guided to the card support part.

In at least an embodiment of the present invention, it is preferable that the shutter member closes or opens the opening part by a moving force of the magnetic head which is moved in the width direction of the conveying passage. In this case, for example, the card reader includes a shutter operation mechanism structured to operate the shutter member, and the head moving mechanism includes a carriage on which the magnetic head is mounted and which is structured to move in the width direction of the conveying passage together with the magnetic head. When one side in the width direction of the conveying passage is referred to as a fifth direction, and the other side in the width direction of the conveying passage is referred to as a sixth direction, the shutter operation mechanism includes a slide member structured to linearly slide in the width direction of the conveying passage, a holding member which slidably holds the slide member, an urging member which urges the slide member to the sixth direction, and a lever member which is turnably held by the holding member and is relatively turnably connected with the shutter member and the slide member. The slide member is formed with a carriage abutting part with which a side face on a fifth direction side of the carriage is capable of abutting and, when the carriage is located at a standby position where the carriage stands by on the fifth direction side relative to the conveying passage, the shutter member closes the opening part. When the carriage located at the standby position is moved to the sixth direction, the slide member is slid to the sixth direction by an urging force of the urging member, and the lever member is turned and thereby the shutter member having closed the opening part opens the opening part and, when the carriage is moved from a sixth direction side to the fifth direction toward the standby position, the carriage is abutted with the carriage abutting part, the slide member is slid to the fifth direction by power of the head moving mechanism and thereby the lever member is turned and the shutter member having opened the opening part closes the opening part. According to this structure, another drive source for operating the shutter member is not required to provide separately. Therefore, the structure of the card reader can be simplified.

In at least an embodiment of the present invention, it is preferable that, when the carriage which is moved to the fifth direction is abutted with the carriage abutting part, a gap of the magnetic head is located on the fifth direction side relative to a magnetic data recorded area of the magnetic stripe. According to this structure, even when the shutter member is moved from the open position to the closing position by using power of the head moving mechanism, lowering of reading accuracy and recording accuracy of magnetic data by the magnetic head can be prevented.

In at least an embodiment of the present invention, it is preferable that the card reader includes a shutter operation mechanism structured to operate the shutter member, and the shutter operation mechanism includes a slide member structured to linearly slide in the width direction of the conveying passage, a holding member which slidably holds the slide member, and a lever member which is turnably held by the holding member and is relatively turnably connected with the shutter member and the slide member. The shutter member and the lever member are formed in a flat plate shape and are disposed so that their thickness directions and a thickness direction of the card are substantially coincided with each other. According to this structure, the sizes of the shutter member and the shutter operation mechanism can be reduced in the thickness direction of the card. Therefore, the size of the card reader can be reduced in the thickness direction of the card.

In at least an embodiment of the present invention, it is preferable that a width of the opening part and a width of the shutter member in the width direction of the conveying passage are set to be wider than a width in a longitudinal direction of the card which is conveyed in the card reader. According to this structure, a width of the opening part in the width direction of the conveying passage is set to be wider and thus, when the magnetic head is to be abutted with a magnetic stripe, behavior of the magnetic head such as a moving speed of the magnetic head can be stabilized. Therefore, reading accuracy and recording accuracy of magnetic data by the magnetic head can be secured. Further, according to this structure, a width of the shutter member in the width direction of the conveying passage is set to be wider and thus, even when the width of the opening part in the width direction of the conveying passage is set to be wider, entering of foreign matters and dust through the opening part can be prevented by the shutter member.

As described above, in at least an embodiment of the present invention, in a card reader in which a card formed in a substantially rectangular shape is conveyed in its short-side direction and processed, even when an opening part for passing the magnetic head moving in a width direction of a conveying passage is formed in a conveying passage, a shutter member for closing the opening part is capable of being moved smoothly.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 5 is an explanatory front view showing a structure of a head moving mechanism shown in FIG. 2.

FIG. 7(A) is a view showing a state that the shutter member closes an opening part and FIG. 7(B) is a view showing a state that the shutter member opens the opening part.

FIG. 9 is a plan view showing the shutter member and the shutter operation mechanism in a state that the shutter member shown in FIG. 2 opens the opening part.

FIGS. 10(A) and 10(B) are views for explaining an effect of the card reader shown in FIG. 1.

DETAILED DESCRIPTION

An embodiment of the present invention will be described below with reference to the accompanying drawings.
(Schematic Structure of Card Reader)

Figure 1:
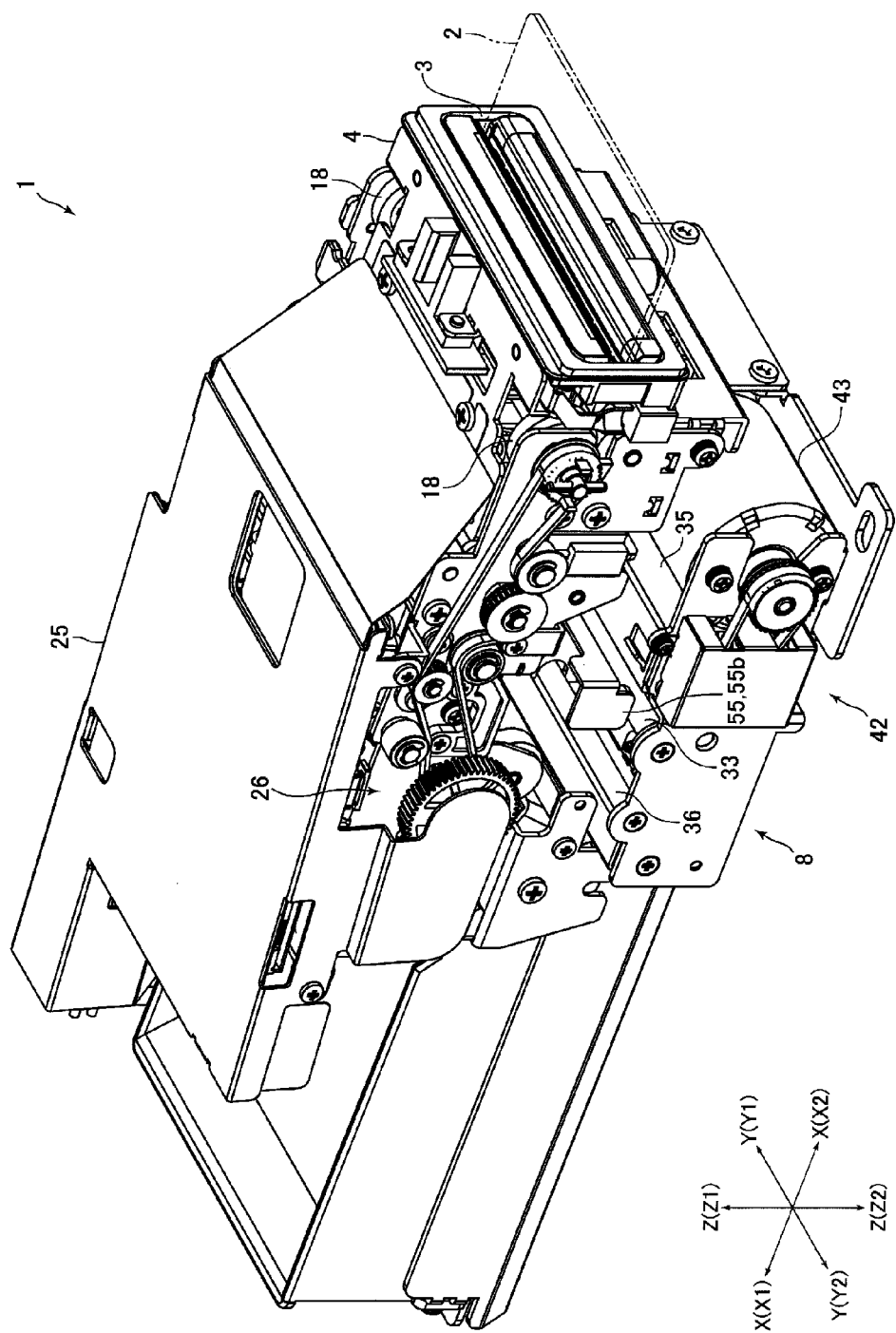
FIG. 1 is a perspective view showing a card reader in accordance with an embodiment of the present invention.
Figure 2:
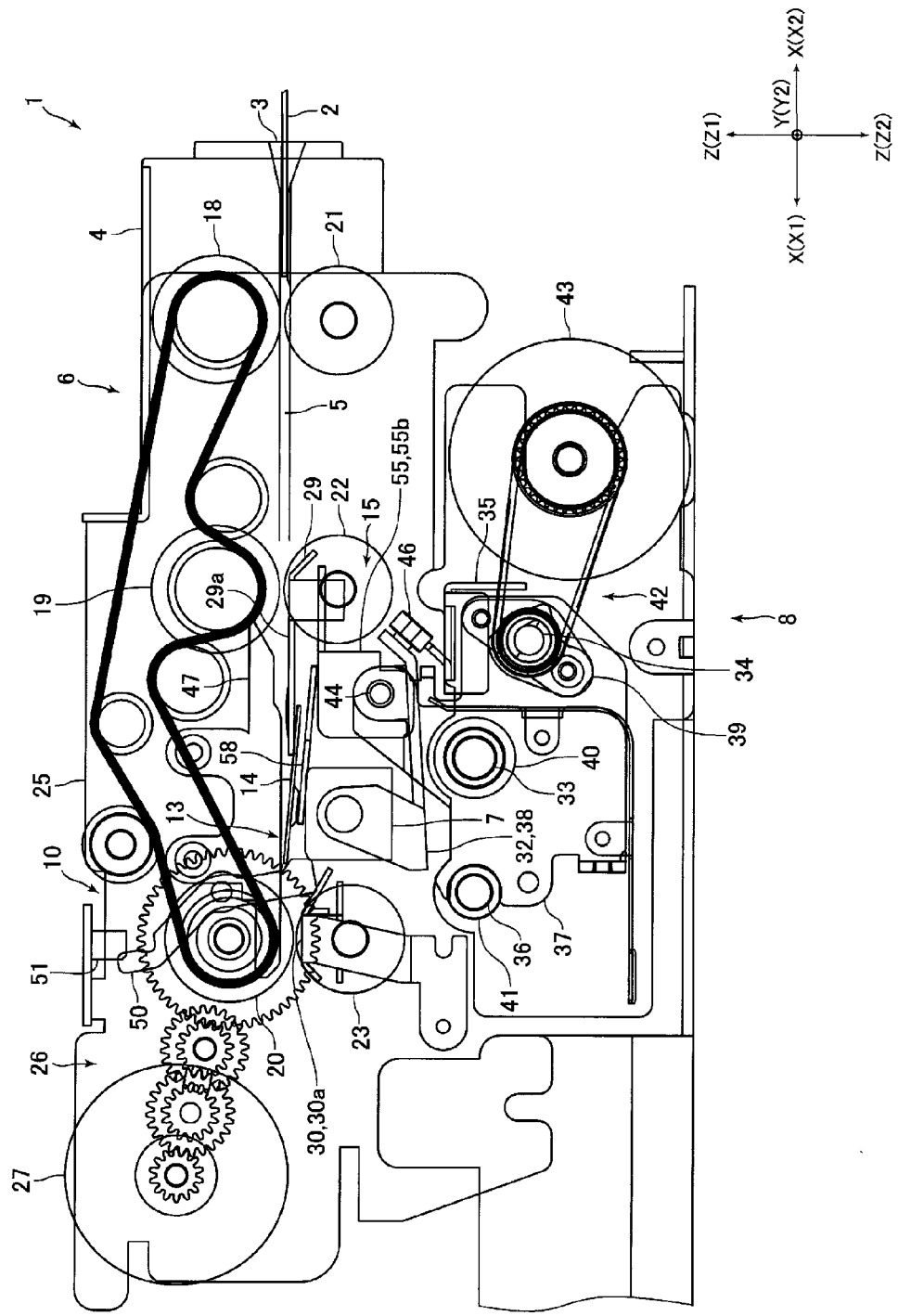
FIG. 2 is an explanatory side view showing a schematic structure of the card reader shown in FIG. 1.
Figure 3:
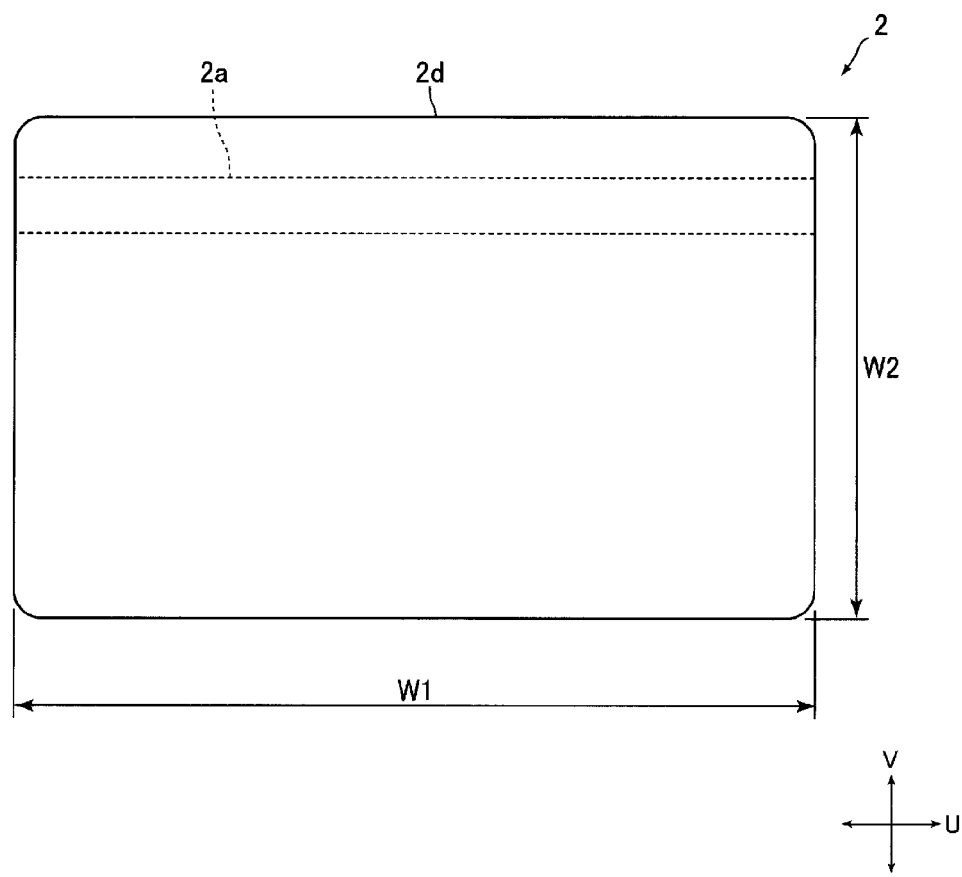
FIG. 3 is a plan view showing a card in FIG. 1.

FIG. 1 is a perspective view showing a card reader 1 in accordance with an embodiment of the present invention. FIG. 2 is an explanatory side view showing a schematic structure of the card reader 1 shown in FIG. 1. FIG. 3 is a plan view showing a card 2 in FIG. 1.

A card reader 1 in this embodiment is a device structured to perform at least one of reading of magnetic data recorded on a card 2 and recording of magnetic data to the card 2. The card reader 1 is mounted on a predetermined host apparatus such as an ATM (Automated Teller Machine) and used. The card reader 1 includes a card insertion part 4 formed with an insertion port 3 into which a card 2 is inserted. As shown in FIG. 2, a conveying passage 5 where a card 2 is conveyed is formed in an inside of the card reader 1. The conveying passage 5 is formed so as to be connected with the insertion port 3.

The card reader 1 also includes a card conveying mechanism 6 structured to convey a card 2, a magnetic head 7 structured to abut with the card 2 to perform reading of magnetic data recorded on the card 2 and/or recording of magnetic data to the card 2, a head moving mechanism 8 structured to move the magnetic head 7 in a direction perpendicular to a conveying direction of the card 2, and a positioning mechanism 10 structured to position the card 2 having been taken into the card reader 1. The conveying passage 5 is formed with an opening part 13 for passing the magnetic head 7. The card reader 1 includes a shutter member 14 for closing the opening part 13 and a shutter operation mechanism 15 for operating the shutter member 14.

A card 2 is made of vinyl chloride and its thickness is about 0.7-0.8 mm. The card 2 in this embodiment is a card with a magnetic stripe in conformity with the international standard (for example, ISO/IEC 7811) or JIS standard (for example, JISX 6302) and is formed in a substantially rectangular shape whose four corners are rounded. A rear face of the card 2 is formed with a magnetic stripe 2a in which magnetic data are recorded. The card 2 may be incorporated with an IC chip.

The magnetic stripe 2*a* is formed in a long and thin strip shape which is parallel to a longitudinal direction ("U" direction in FIG. 3) of a card 2 formed in a substantially rectangular shape. The magnetic stripe 2*a* is formed over the entire region in the longitudinal direction of the card 2. Further, in a short-side direction of the card 2 ("V" direction in FIG. 3), the magnetic stripe 2*a* is formed on one end 2*d* side in the short-side direction of the card 2. Specifically, the magnetic stripe 2*a* is formed within a predetermined range with the one end 2*d* in the short-side direction of the card 2 as a reference based on the international standard or JIS standard.

In this embodiment, a card 2 is conveyed in an "X" direction shown in FIG. 1 and the like. Specifically, a card 2 is taken in an "X1" direction and the card 2 is ejected in an "X2" direction. In other words, the "X" direction is a conveying direction of a card 2, the "X1" direction is a taking-in direction of a card 2, and the "X2" direction is an ejecting direction of a card 2. Further, in this embodiment, a card 2 is taken into the card reader 1 so that a short-side direction of a card 2 and the "X" direction are coincided with each other. Further, the card 2 is conveyed in an inside of the card reader 1 so that a short-side direction of a card 2 and the "X" direction are coincided with each other. In other words, the card reader 1 conveys a card 2 in a short-side direction of the card 2 and performs a predetermined processing.

A "Y" direction perpendicular to the "X" direction is a width direction of a conveying passage 5 and is a longitudinal direction of a card 2 which is taken into the card reader 1 in a correct posture. Further, a "Z" direction in FIG. 1 and the like perpendicular to the "X" direction and the "Y" direction is a height direction of the conveying passage 5 and is a thickness direction of a card 2 having been taken into the card reader 1. In this embodiment, the card reader 1 is disposed so that the "Z" direction and a vertical direction are coincided with each other. In the following descriptions, the "X" direction is referred to as a "front and rear direction", the "Y" direction is referred to as a "right and left direction", and the "Z" direction is as an "upper and lower direction". Further, an "X1" direction side is referred to as a "rear (back)" side, an "X2" direction side is as a "front" side, a "Y1" direction side is as a "right" side, a "Y2" direction side is as a "left" side, a "Z1" direction side is as an "upper" side, and a "Z2" direction side is as a "lower" side.

The "Z2" direction (lower direction) in this embodiment is a first direction which is one side in the thickness direction of a card 2, the "Z1" direction (upper direction) is a second direction which is the other side in the thickness direction of the card 2, the "X1" direction (rear direction) is a third direction which is a taking-in direction of the card 2, and the "X2" direction (front direction) is a fourth direction which is an ejecting direction of the card 2. Further, the "Y2" direction (left direction) is a fifth direction which is one side in the width direction of the conveying passage 5 and the "Y1" direction (right direction) is a sixth direction which is the other side in the width direction of the conveying passage 5.

(Structure of Card Conveying Mechanism and Structure of Conveying Passage)

The conveying passage 5 is formed in a substantially entire region of the card reader 1 in the front and rear direction. A card conveying mechanism 6 includes conveying rollers 18 through 20 structured to contact with an upper face of a card 2 and to convey the card 2, and pad rollers 21 through 23 which are oppositely disposed from a lower side to the conveying rollers 18 through 20. The conveying roller 18 is disposed in an inside of a card insertion part 4. The conveying rollers 19 and 20 are disposed in an inside of a main body part 25 of the card reader 1 which is disposed to a rear side of the card insertion part 4. The conveying roller 19 is disposed on a front side relative to the magnetic head 7 in the front and rear direction. The conveying roller 20 is disposed on a rear side relative to the magnetic head 7 and is disposed on a rear side relative to a card abutting part 50*a* of a positioning member 50 described below which structures a positioning mechanism 10. The conveying rollers 18 through 20 are connected with a motor 27 through a power transmission mechanism 26 which is structured of a belt, pulleys, a gear train and the like. The pad roller 21 is urged toward the conveying roller 18, the pad roller 22 is urged toward the conveying roller 19, and the pad roller 23 is urged toward the conveying roller 20.

Guide members 29 and 30 for guiding an under face of a card 2 are disposed in an inside of the main body part 25. The guide members 29 and 30 are fixed to a frame of the main body part 25 of the card reader 1. The guide members 29 and 30 are provided with guide parts 29*a* and 30*a* which structure a part of a lower side of the conveying passage 5 and an under face of a card 2 is guided by the guide parts 29*a* and 30*a*. The guide part 29*a* is disposed on a front side relative to the magnetic head 7 in the front and rear direction. The guide part 30*a* is disposed on a rear side relative to the magnetic head 7 in the front and rear direction and is disposed at a substantially same position as the positioning mechanism 10.

A portion of a lower face of the conveying passage 5 between the guide part 29*a* and the guide part 30*a* is formed to be the opening part 13 described above. In other words, the opening part 13 is formed on a lower face side of the conveying passage 5. The opening part 13 is formed over a substantially entire region of the conveying passage 5 in the right and left direction. A width of the opening part 13 in the right and left direction is set to be wider than a width "W1" (see FIG. 3) in a longitudinal direction of a card 2 conveyed in the conveying passage 5. Further, the opening part 13 is formed so that the magnetic head 7 moving in the right and left direction is capable of passing. Further, the positioning member 50 described below which structures the positioning mechanism 10 is disposed at a substantially same position as the guide part 30*a* of the guide member 30 in the front and rear direction. The opening part 13 is formed between the guide part 29*a* and the positioning member 50 in the front and rear direction.

(Structure of Head Moving Mechanism and Surrounding Structure of Magnetic Head)

Figure 4:
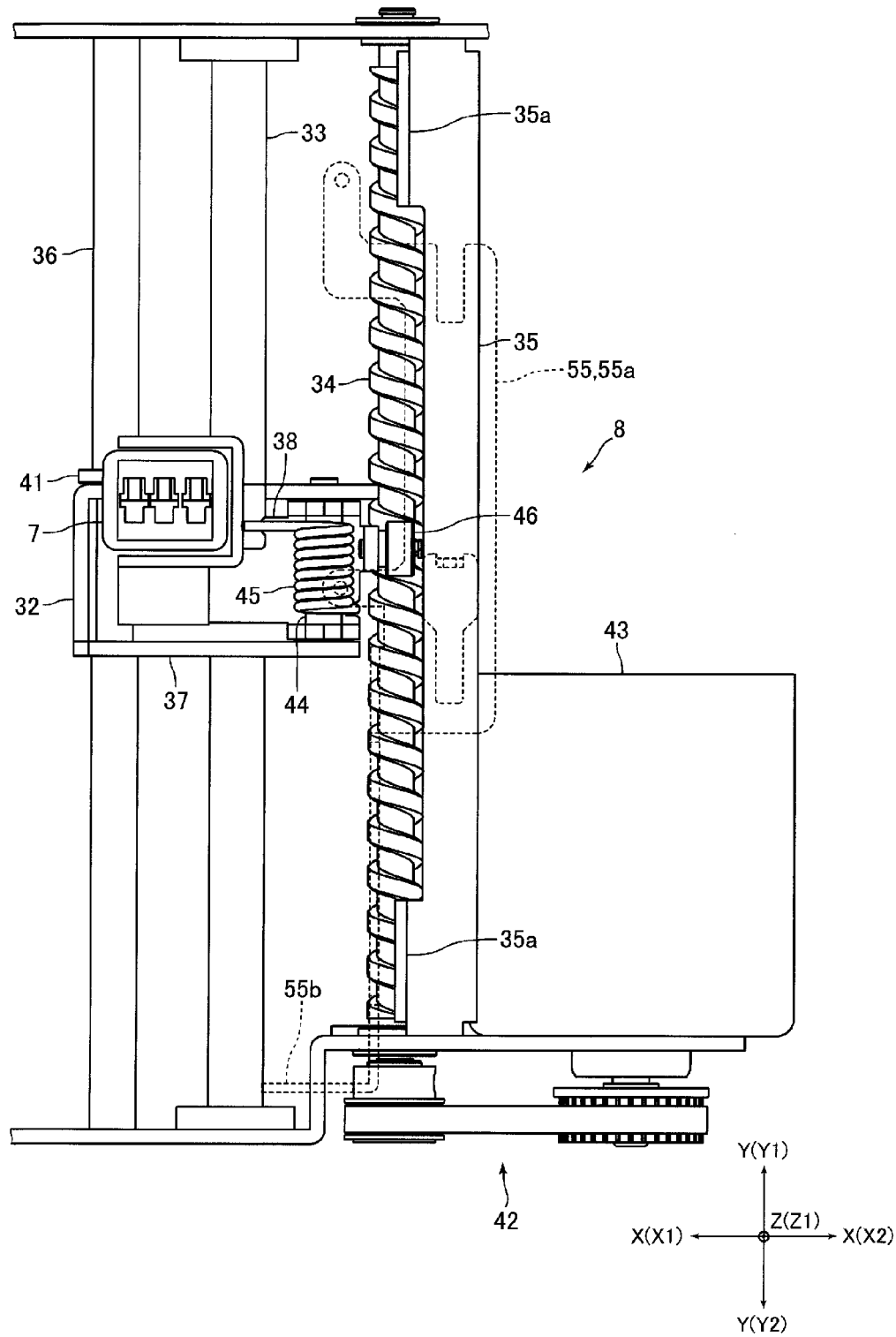
FIG. 4 is an explanatory top plan view showing a structure of a head moving mechanism shown in FIG. 2.

FIG. 4 is an explanatory top plan view showing a structure of a head moving mechanism 8 shown in FIG. 2. FIG. 5 is an explanatory front view showing a structure of the head moving mechanism 8 shown in FIG. 2.

The magnetic head 7 is disposed between the guide part 29*a* and the guide part 30*a* in the front and rear direction. The head moving mechanism 8 includes a carriage 32 on which the magnetic head 7 is mounted, a guide shaft 33 structured to guide a carriage 32 in the right and left direction, a lead screw 34 structured to feed the carriage 32 in the right and left direction, a cam plate 35 structured to move the magnetic head 7 up and down, and a turning prevention shaft 36 for preventing turning of the carriage 32 with the guide shaft 33 as a turning center. The carriage 32 includes a carriage main body 37 and a head holding member 38 which holds the magnetic head 7. The carriage main body 37 is attached with a female screw member 39 engaged with the lead screw 34, a slide bearing 40 engaged with the guide shaft 33, and a slide member 41 engaged with the turning prevention shaft 36. The lead screw 34 is connected with a motor 43 through a power transmission mechanism 42 which is structured of pulleys and a belt.

The carriage main body 37 is fixed with a fixed shaft 44 which turnably holds a head holding member 38 with the right and left direction as an axial direction. A torsion coil spring 45 is disposed between the carriage main body 37 and the head holding member 38. The head holding member 38 is urged by an urging force of the torsion coil spring 45 in a direction that the magnetic head 7 is moved upward with the fixed shaft 44 as a turning center. The cam plate 35 is formed in an elongated shape which is long and thin in the right and left direction and the head holding member 38 is rotatably attached with a roller 46 which is structured to abut with the cams 35*a* formed on both end sides of the cam plate 35 in the right and left direction.

In this embodiment, when the motor 43 is driven and the lead screw 34 is rotated, the magnetic head 7 is moved along the guide shaft 33 in the right and left direction together with the carriage 32. The roller 46 is abutted with the cam 35*a* on both end sides in the right and left direction and, as shown by the two-dot chain line in FIG. 5, the magnetic head 7 is retreated to a lower side with respect to the conveying passage 5 against an urging force of the torsion coil spring 45. In other words, the magnetic head 7 moving in the right and left direction is located at a head retreated position that is retreated from the conveying passage 5 to a lower side on both end sides in the right and left direction.

On the other hand, when the magnetic head 7 is moved in the right and left direction together with the carriage 32 and the roller 46 is disengaged from the cam 35*a*, the magnetic head 7 having been guided so as to retreat to a lower side with respect to the conveying passage 5 by the cam 35*a* is moved upward by an urging force of the torsion coil spring 45 and is set to be capable of abutting with a magnetic stripe 2*a* of a card 2 from a lower side. In other words, in a state that the roller 46 is disengaged from the cam 35*a*, the magnetic head 7 is located at a head abutting position where the magnetic head 7 is capable of abutting with the magnetic stripe 2*a*. When the carriage 32 is moved in the right and left direction while the magnetic head 7 is abutted with the magnetic stripe 2*a*, reading and recording of magnetic data are performed by the magnetic head 7. When the magnetic head 7 is moved in the right and left direction, the magnetic head 7 is passed through the opening part 13.

As described above, the head moving mechanism 8 moves the magnetic head 7 in the right and left direction and moves the magnetic head 7 between the head abutting position where the magnetic head 7 is capable of abutting with the magnetic stripe 2*a* and the head retreated position where the magnetic head 7 is retreated from the conveying passage 5. Further, in a standby state that a card 2 is not inserted into the card reader 1, the magnetic head 7 stands by at the head retreated position at a left end in the moving range. In this case, the magnetic head 7 and the carriage 32 are disposed on a left side relative to the conveying passage 5. In other words, in a standby state before a card 2 is inserted into the card reader 1, the magnetic head 7 and the carriage 32 stand by in a state that the magnetic head 7 is retreated to a lower side from the conveying passage 5 and on a left side relative to the conveying passage 5.

An opposite member 47 which is formed with an opposed face 47*a* for abutting the magnetic head 7 located at the head abutting position with a card 2 at a predetermined abutting pressure is disposed to an upper side of the magnetic head 7. The opposite member 47 is fixed to a frame of the main body part 25 of the card reader 1. The opposed face 47*a* structures a part on an upper side of the conveying passage 5. Further, the opposed face 47*a* is formed in a flat face shape which is perpendicular to the upper and lower direction. When the magnetic head 7 is located at the head abutting position, as shown in FIG. 5, a card 2 is sandwiched between the opposed face 47*a* and the magnetic head 7. In this case, the magnetic head 7 is abutted with a magnetic stripe 2*a* of a card 2 inserted in a correct posture from a lower side at a predetermined abutting pressure.

(Structure of Positioning Mechanism)

Figure 6A:
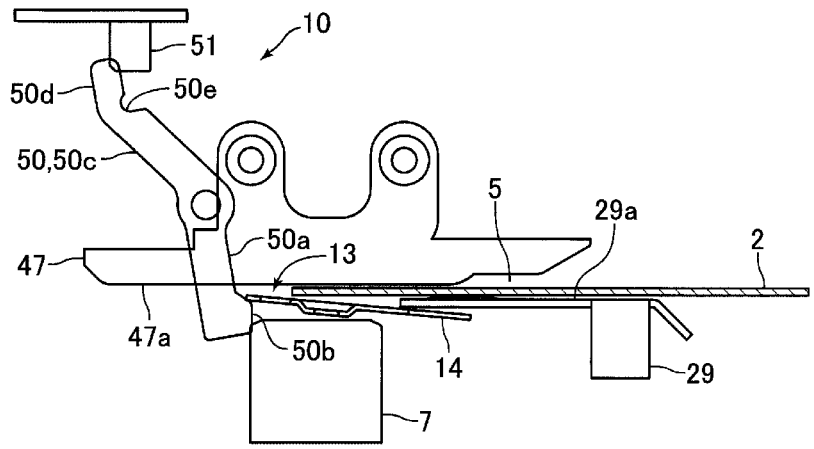
FIGS. 6(A), 6(B) and 6(C) are explanatory side views showing operation of a positioning mechanism and operation of a shutter member shown in FIG. 2.
Figure 6B:
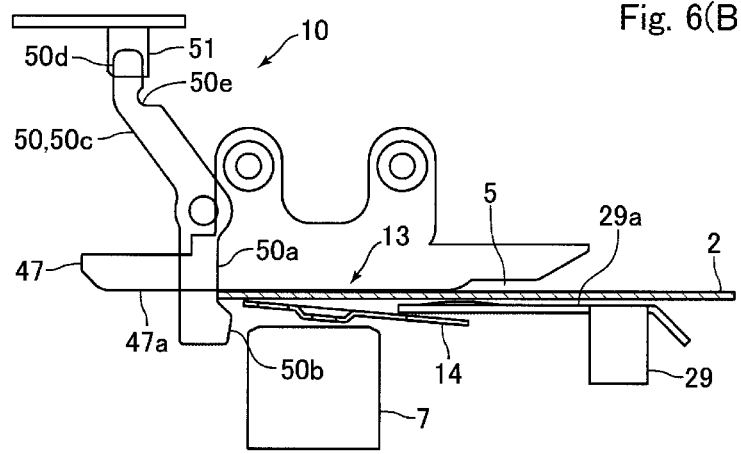
Figure 6C:
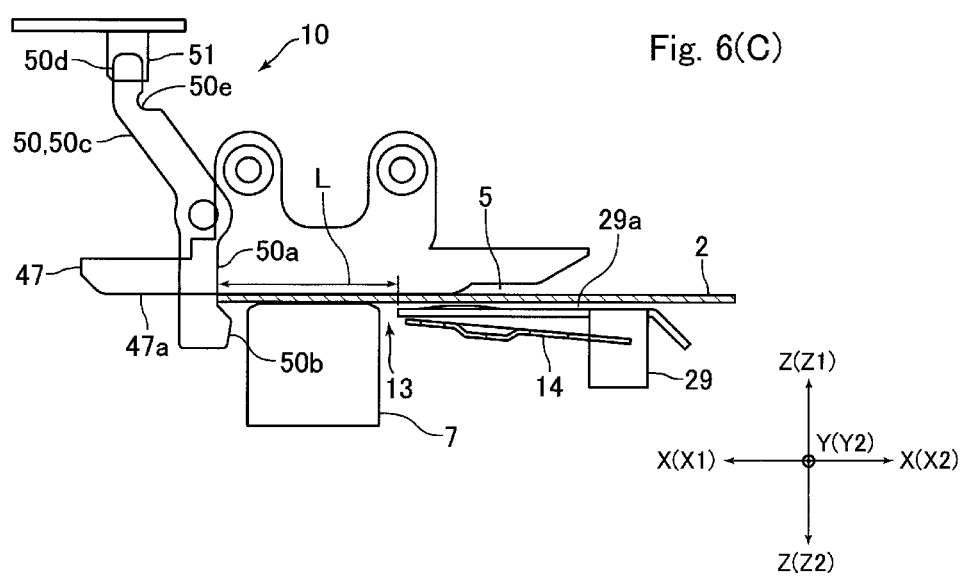

FIGS. 6(A), 6(B) and 6(C) are explanatory side views showing operation of the positioning mechanism 10 and operation of the shutter member 14 shown in FIG. 2.

The positioning mechanism 10 includes a positioning member 50 structured to position a card 2 with respect to the magnetic head 7 in the front and rear direction. The positioning mechanism 10 in this embodiment includes two positioning members 50 which are separately disposed from each other with a predetermined distance therebetween in the right and left direction. Further, the positioning mechanism 10 includes a sensor 51 for detecting movement of the positioning member 50 which is capable of turning. The sensor 51 is a transmission type optical sensor having a light emitting element and a light receiving element which receives light from the light emitting element.

The positioning member 50 is formed in a flat plate shape and is disposed so that its thickness direction and the right and left direction are substantially coincided with each other. The positioning member 50 is provided with a card abutting part 50*a* structured to abut with a rear end of a card 2 having been taken into the card reader 1, a card support part 50*b* which is capable of contacting with an under face of the card 2 when the rear end of the card 2 is abutted with the card abutting part 50*a*, and an arm part 50*c* which is extended from an upper end of the card abutting part 50*a* toward a substantially upper side. The positioning member 50 is turnably held by a fixed shaft which is disposed with the right and left direction as an axial direction in a boundary part between the card abutting part 50*a* and the arm part 50*c*. Further, the positioning member 50 is disposed at a substantially same position as the guide part 30*a* of the guide member 30 in the front and rear direction.

The card abutting part 50*a* is formed in a substantially rectangular shape which is long and thin in the upper and lower direction. The card support part 50*b* is connected with a lower end of the card abutting part 50*a* and structures a lower end side portion of the positioning member 50. The card support part 50*b* is formed in a substantially trapezoid shape when viewed in the right and left direction. A front end side of the card support part 50*b* is protruded to a front side relative to a front end of the card abutting part 50*a*. Further, an upper end side of a front end face of the card support part 50*b* is formed to be an inclined face which is inclined to a lower direction toward a front side and an under face of a card 2 is capable of contacting with the inclined face. In other words, an under face side of a card 2 can be supported by the inclined face.

A light intercepting part 50*d* for intercepting between a light emitting element and a light receiving element of the sensor 51 is formed on an upper end side of the arm part 50*c*. A lower side of the light intercepting part 50*d* is formed with a spring engaging part 50*e* with which one end of a tension coil spring not shown is engaged. The other end of the tension coil spring is fixed to the frame of the main body part 25 and the positioning member 50 is urged by the tension coil spring in a counterclockwise turning direction (counterclockwise direction) in FIGS. 6(A), 6(B) and 6(C).

In this embodiment, when a card 2 is not abutted with the card abutting part 50a, the positioning member 50 is urged in a counterclockwise direction by an urging force of the tension coil spring so that the front end face of the card abutting part 50a is slightly inclined to a rear side with respect to the upper and lower direction (see FIG. 6(A)). In this state, when a rear end of a card 2 inserted into the insertion port 3 and conveyed to a rear side by the card conveying mechanism 6 is abutted with the card abutting part 50a, as shown in FIG. 6(B), the card abutting part 50a is pressed by the card 2 and the positioning member 50 is turned in a clockwise direction as shown in FIG. 6(B) and is abutted with a stopper not shown.

When the positioning member 50 is abutted with the stopper, the card 2 is positioned in the front and rear direction. In this state, a front end face of the card abutting part 50a becomes substantially parallel to the upper and lower direction. When the rear end of the card 2 is abutted with the card abutting part 50a and the card 2 is positioned, a distance "L" between the card abutting part 50a and a rear end of the guide part 29a of the guide member 29 in the front and rear direction (see FIG. 6(C)) is set to be shorter than the width "W2" in a short-side direction of the card 2. In other words, in this embodiment, a distance between the card abutting part 50a and the rear end of the guide part 29a in the front and rear direction is set to be shorter than the width "W2" in a short-side direction of a card 2.

As shown in FIG. 6(A), when a card 2 is not abutted with the card abutting part 50a, the light intercepting part 50d is separated from a position between the light emitting element and the light receiving element of the sensor 51. On the other hand, as shown in FIG. 6(B), when a rear end of a card 2 is abutted with the card abutting part 50a, the light intercepting part 50d intercepts between the light emitting element and the light receiving element of the sensor 51. In this embodiment, when light emitted from a light emitting element of the sensor 51 to its light receiving element is intercepted by the light intercepting part 50d, it is detected that a rear end of a card 2 is abutted with two card abutting parts 50a and the card 2 is positioned in the front and rear direction.

The positioning mechanism 10 includes a retreating mechanism (not shown) structured to retreat the card abutting part 50a and the card support part 50b from the conveying passage 5. When the retreating mechanism is driven, the card abutting part 50a and the card support part 50b are retreated from the conveying passage 5 to an upper side and thus the card 2 can be passed toward the conveying roller 20 and the pad roller 23. In this embodiment, the card abutting part 50a and the card support part 50b are normally located at a position where a rear end of a card 2 can be abutted with the card abutting part 50a and, when a predetermined processing is to be performed, they are retreated from the conveying passage 5 to an upper side.

(Structure of Shutter Member and Structure of Shutter Operation Mechanism)

Figure 7A:
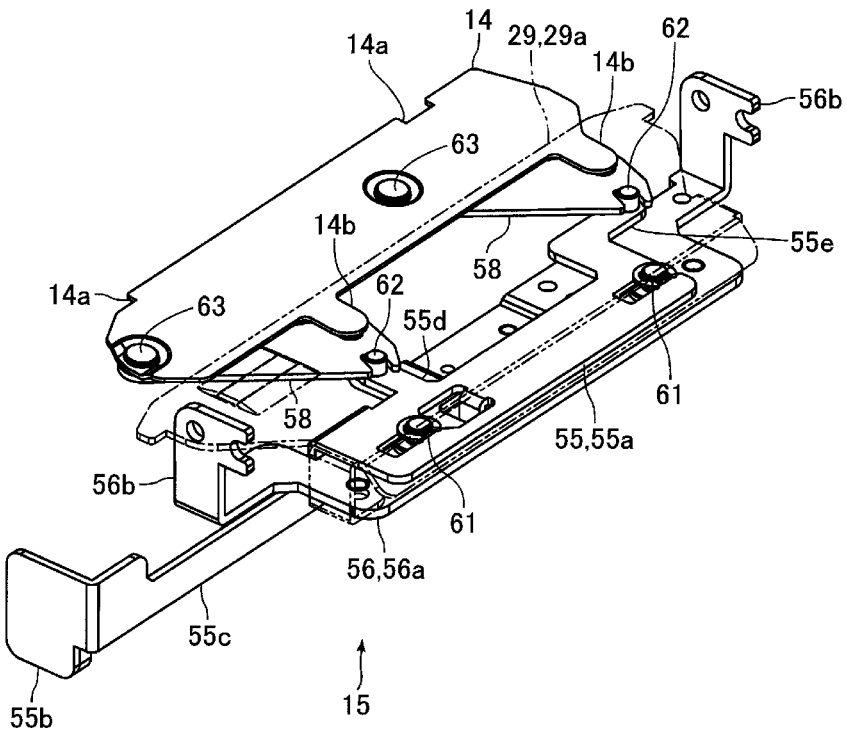
FIGS. 7(A) and 7(B) are perspective views showing a shutter member and a shutter operation mechanism shown in FIG. 2.
Figure 7B:
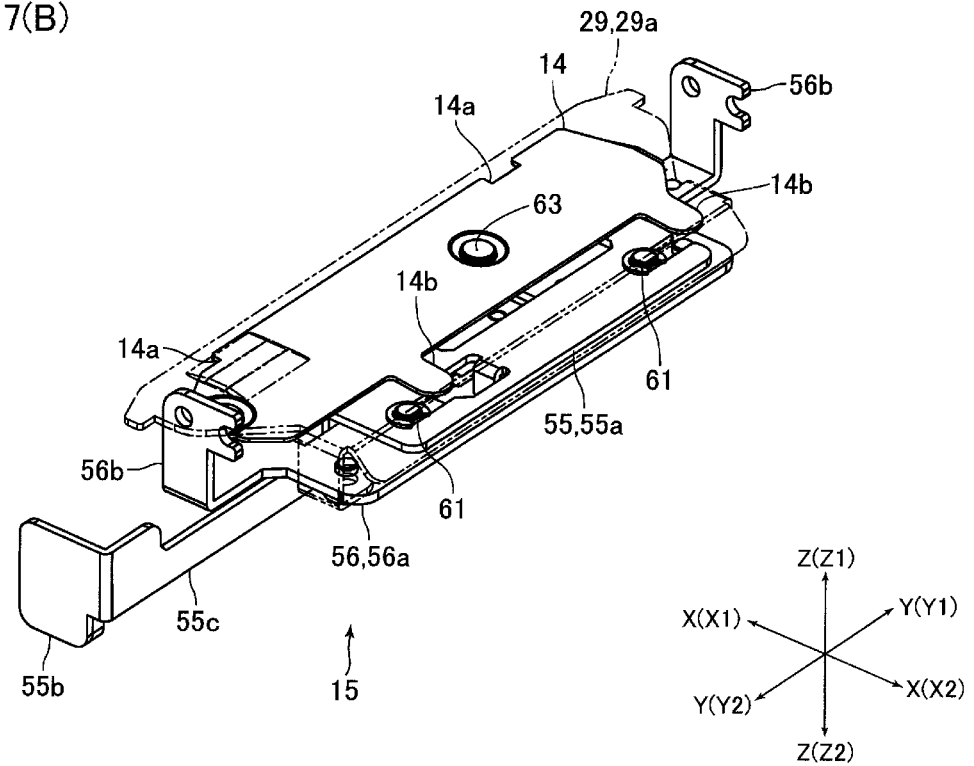
Figure 8:
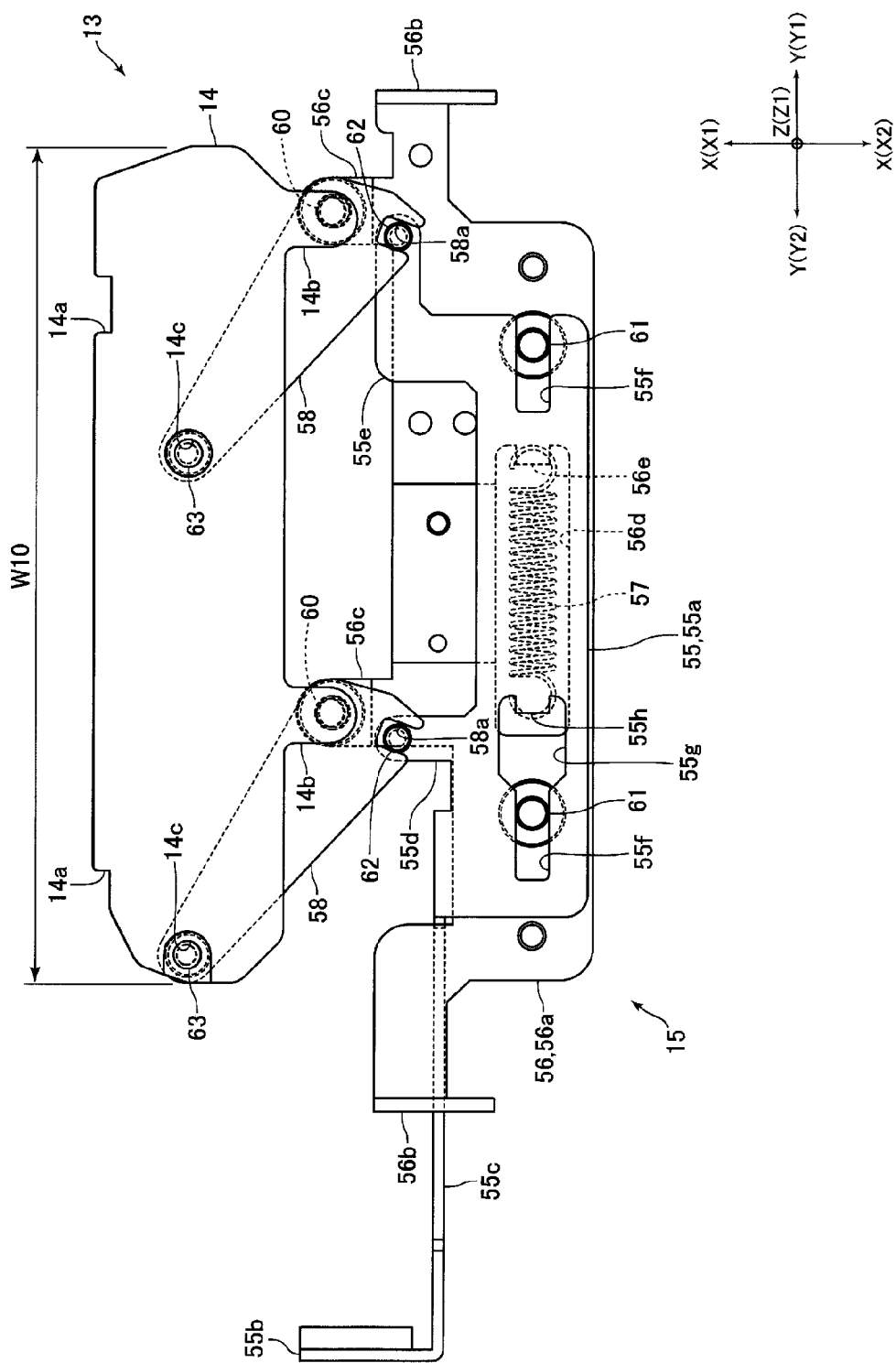
FIG. 8 is a plan view showing the shutter member and the shutter operation mechanism in a state that the shutter member shown in FIG. 2 closes the opening part.

FIGS. 7(A) and 7(B) are perspective views showing a shutter member 14 and a shutter operation mechanism 15 shown in FIG. 2. FIG. 7(A) is a view showing a state that the shutter member 14 closes the opening part 13 and FIG. 7(B) is a view showing a state that the shutter member 14 opens the opening part 13. FIG. 8 is a plan view showing the shutter member 14 and the shutter operation mechanism 15 in a state that the shutter member 14 shown in FIG. 2 closes the opening part 13. FIG. 9 is a plan view showing the shutter member 14 and the shutter operation mechanism 15 in a state that the shutter member 14 shown in FIG. 2 opens the opening part 13.

The shutter member 14 is formed in a flat plate shape. The shutter member 14 is disposed so that its thickness direction is substantially coincided with the upper and lower direction. Further, the shutter member 14 is formed in a substantially rectangular shape which is long and thin in the right and left direction. A width "W10" in the right and left direction of the shutter member 14 (see FIG. 8) is set to be wider than the width "W1" in a longitudinal direction of a card 2 which is conveyed in an inside of the card reader 1.

Cut-out parts 14a are formed on a rear end side of the shutter member 14 for preventing an interference with the positioning members 50. The cut-out part 14a is formed so as to recess from a rear end face of the shutter member 14 toward a front side. Two protruded parts 14b straightly protruding toward a front side are formed on a front end side of the shutter member 14. Further, two circular through-holes 14c are formed at a substantially center position of the shutter member 14 in the front and rear direction. The through-hole 14c is formed so as to penetrate through the shutter member 14 in the upper and lower direction.

Two protruded parts 14b are separately formed from each other with a predetermined distance therebetween in the right and left direction, and the two through-holes 14c are separately formed from reach other with a predetermined distance therebetween in the right and left direction. Specifically, the two protruded parts 14b and the two through-holes 14c are formed with the same distance as an arrangement distance in the right and left direction of two lever members 58 described below which structure a shutter operation mechanism 15. One protruded part 14b of the two protruded parts 14b is formed on a right end side of the shutter member 14. Further, one through-hole 14c of the two through-holes 14c is formed on a left end side of the shutter member 14.

The shutter operation mechanism 15 includes a slide member 55 structured to linearly slide in the right and left direction, a holding member 56 which slidably holds the slide member 55, a tension coil spring 57 as an urging member which urges the slide member 55 to a left direction, and two lever members 58 which are turnably held by the holding member 56 and are turnably connected with the shutter member 14 and the slide member 55.

The holding member 56 is provided with a holding part 56a which holds the slide member 55 and the lever members 58 and two fixed parts 56b which are fixed to the frame of the main body part 25. The holding part 56a is formed in a flat plate shape and is disposed so that its thickness direction and the upper and lower direction are substantially coincided with each other. The fixed part 56b is formed in a flat plate shape and is disposed so that its thickness direction and the right and left direction are substantially coincided with each other. The two fixed parts 56b are respectively formed so as to be stood up to an upper side from both right and left ends of the holding part 56a.

Two protruded parts 56c which are straightly protruded toward a rear side are formed on a rear end side of the holding part 56a. The two protruded parts 56c are separately formed from each other with a predetermined distance therebetween in the right and left direction. Specifically, the two protruded parts 56c are separately formed with the same distance as an arrangement distance of the two lever members 58 in the right and left direction. One protruded part 56c of the two protruded parts 56c is formed on a right end side of the holding part 56a. Further, the protruded part 56c is slightly inclined so as to go upward toward a rear side with respect to the "XY" plane structured of the front and rear direction and the right and left direction. Specifically, the protruded part 56c is inclined by about 3° to 5° with respect to the "XY" plane. A fixed shaft 60 which is a turning center of the lever member 58 is fixed on a tip end side (rear end side) of the protruded part 56c. The fixed shaft 60 is fixed on an upper face side of the protruded part 56c so that its axial direction and the upper and lower direction are coincided with each other.

Two guide shafts 61 which guide the slide member 55 in the right and left direction are fixed on a front end side of the holding part 56a. The two guide shafts 61 are fixed to the holding part 56a in a state that they are separated from each other with a predetermined distance therebetween in the right and left direction. Specifically, the two guide shafts 61 are separately fixed with the same distance as the arrangement distance of the two lever members 58 in the right and left direction. Further, the guide shaft 61 is fixed on an upper face side of the holding part 56a so that its axial direction and the upper and lower direction are coincided with each other. In addition, an opening part 56d formed in a substantially rectangular shape which is penetrated in the upper and lower direction is formed between the two guide shafts 61 in the right and left direction. A tension coil spring 57 is disposed in the opening part 56d. Further, a spring attaching part 56e to which one end of the tension coil spring 57 is attached is formed at an edge on the right side of the opening part 56d.

The slide member 55 is provided with a slide part 55a which is disposed to an upper side of the holding part 56a, a carriage abutting part 55b with which the carriage 32 moving from a right end side to the left direction is capable of abutting, and a connecting part 55c connecting the slide part 55a with the carriage abutting part 55b. The slide part 55a is formed in a flat plate shape and is disposed so that its thickness direction and the upper and lower direction are substantially coincided with each other. The carriage abutting part 55b is formed in a flat plate shape and is disposed so that its thickness direction and the right and left direction are substantially coincided with each other. The connecting part 55c is formed in a flat plate shape and is disposed so that its thickness direction and the front and rear direction are substantially coincided with each other.

The connecting part 55c is formed so as to extend from a left rear end side of the slide part 55a to the left direction. Further, the connecting part 55c is formed so as to be connected with an under face of the slide part 55a and is disposed on a lower side with respect to the slide part 55a. The carriage abutting part 55b is formed so as to be bent toward a rear side from a left end of the connecting part 55c. Further, the carriage abutting part 55b is disposed on a left side relative to the fixed part 56b which is disposed on the left side of the two fixed parts 56b. The carriage abutting part 55b is capable of abutting with a left side face of the carriage 32 (see FIG. 4). A right end side of the connecting part 55c is disposed to a lower side of the holding member 56.

Two protruded parts 55d and 55e protruding toward a rear side are formed on a rear end side of the slide part 55a. The protruded part 55d is formed on a left end side of the slide part 55a and the protruded part 55e is formed on a right end side of the slide part 55a. The protruded part 55d is protruded in a straight shape toward a rear side. The protruded part 55e is protruded toward a rear side and then protruded toward a right side. A shape of the protruded part 55e when viewed in the upper and lower direction is formed in a substantially "L"-shape. Engaging shafts 62 which are engaged with engaging grooves 58a described below formed in the lever members 58 are fixed to tip end sides (rear end sides) of the protruded parts 55d and 55e. The engaging shafts 62 are fixed to upper face sides of the protruded parts 55d and 55e so that their axial directions and the upper and lower direction are coincided with each other. Further, the two engaging shafts 62 are separately disposed with the same distance as the arrangement distance of the two lever members 58 in the right and left direction.

Two engaging grooves 55f with which two guide shafts 61 are respectively engaged are formed on a front end side of the slide part 55a. The engaging groove 55f is formed in an elongated hole shape which is long in the right and left direction. Further, the engaging groove 55f is formed so as to penetrate through the slide part 55a in the upper and lower direction. The two engaging grooves 55f are separately formed from each other with a predetermined distance therebetween in the right and left direction. The guide shaft 61 is engaged with the engaging groove 55f so that the slide member 55 is slidable in the right and left direction with respect to the holding member 56.

An opening part 55g is formed so as to be connected with a right end of the engaging groove 55f which is disposed on the left side. The opening part 55g is formed so as to penetrate through the slide part 55a in the upper and lower direction. A spring attaching part 55h to which the other end of the tension coil spring 57 is attached is formed at an edge on a right side of the opening part 55g. The slide member 55 is urged to the right side by an urging force of the tension coil spring 57. In this embodiment, a moving range of the slide member 55 to the right direction is, as shown in FIG. 9, restricted by abutting the guide shaft 61 with a left end of the engaging groove 55f.

A lever member 58 is formed in a flat plate shape and is disposed so that its thickness direction and the upper and lower direction are substantially coincided with each other. Two lever members 58 are separately disposed from each other with a predetermined distance therebetween in the right and left direction. A through-hole into which the fixed shaft 60 is inserted is formed on one end side and a rear end side of the lever member 58. The fixed shaft 60 is inserted into the through-hole from a lower side and the lever member 58 is disposed on an upper side with respect to the holding part 56a of the holding member 56. The fixed shaft 60 is engaged with the through-hole so that the lever member 58 is relatively turnable with respect to the holding member 56.

An engaging groove 58a with which the engaging shaft 62 is engaged is formed on one end side and a front end side of the lever member 58. The engaging groove 58a is formed so as to penetrate through the lever member 58 in the upper and lower direction. The engaging shaft 62 is engaged with the engaging groove 58a from a lower side and the lever member 58 is disposed to an upper side of the slide part 55a of the slide member 55. The engaging shaft 62 is engaged with the engaging groove 58a so that the lever member 58 is relatively turnable with respect to the slide member 55.

The other end side of the lever member 58 is disposed on a left side with respect to the one end side of the lever member 58. A fixed shaft 63 is fixed to the other end side of the lever member 58. The fixed shaft 63 is fixed to an upper face side of the lever member 58 so that its axial direction and the upper and lower direction are coincided with each other. The fixed shaft 63 is inserted into the through-hole 14c of the shutter member 14 from a lower side, and the shutter member 14 is disposed to an upper side of the lever member 58. The fixed shaft 63 is engaged with the through-hole 14c so that the shutter member 14 is relatively turnable with respect to the lever member 58.

As described above, the protruded parts 56c of the holding member 56 are slightly inclined with respect to the "XY" plane so as to go upward toward a rear side. Therefore, the lever members 58 which are turnable with the fixed shafts 60 fixed to the protruded parts 56c as turning centers are also inclined slightly so as to go upward toward a rear side with respect to the "XY" plane. Further, the shutter member 14 which is turnable with the fixed shafts 63 fixed to the lever members 58 as turning centers are also inclined slightly so as to go upward toward a rear side with respect to the "XY" plane. In other words, in both cases that the shutter member 14 closes the opening part 13 and that the shutter member 14 opens the opening part 13, the shutter member 14 and the lever member 58 are slightly inclined so as to go upward toward a rear side with respect to the "XY" plane.

In this embodiment, when the carriage 32 is located at a standby position where the magnetic head 7 and the carriage 32 stand by at a position on a left side with respect to the conveying passage 5, the carriage abutting part 55b is abutted with a left side face of the carriage 32 and the slide member 55 is located at a position moved to a left side against an urging force of the tension coil spring 57. In this case, the shutter member 14 is, as shown in FIG. 7(A) and FIG. 8, disposed on a rear side and, as shown in FIG. 6(A), the opening part 13 is closed.

When the carriage 32 located at the standby position is moved to the right direction, the slide member 55 is slid to the right direction by an urging force of the tension coil spring 57. When the slide member 55 slides to the right direction, the lever members 58 are turned in a counter-clockwise turning direction (counterclockwise direction) in FIG. 8 with the fixed shafts 60 as turning centers. When the lever members 58 are turned in the counterclockwise direction, as shown in FIG. 7(B) and FIG. 9, the shutter member 14 is moved to a front side and, as shown in FIG. 6(C), the opening part 13 is opened.

When the carriage 32 is moved from a right side to the left direction toward the standby position and a left side face of the carriage 32 is abutted with the carriage abutting part 55a, the slide member 55 is slid to the left direction by power of the head moving mechanism 8 (specifically, power of motor 43). When the slide member 55 slides to the left direction, the lever members 58 are turned in a clockwise turning direction (clockwise direction) in FIG. 8 with the fixed shafts 60 as turning centers. When the lever members 58 are turned to the clockwise direction, as shown in FIG. 7(A) and FIG. 8, the shutter member 14 is moved to the rear side and, as shown in FIG. 6(A), the opening part 13 is closed.

As described above, in this embodiment, the shutter member 14 opens the opening part 13 by an urging force of the tension coil spring 57 and closes the opening part 13 by a moving force of the magnetic head 7 which is moved to the left direction. Further, in this embodiment, the shutter member 14 opens the opening part 13 before the magnetic head 7 is moved to the head abutting position where the magnetic head 7 is capable of abutting with a magnetic stripe 2a. In addition, in this embodiment, when the left side face of the carriage 32 moved to the left direction is abutted with the carriage abutting part 55b, a gap of the magnetic head 7 is disposed on the left side with respect to a magnetic data recorded area of a magnetic stripe 2a of a card 2. In other words, the left side face of the carriage 32 moved to the left direction is abutted with the carriage abutting part 55b after the gap of the magnetic head 7 has passed through the magnetic data recorded area of the magnetic stripe 2a. More specifically, when the left side face of the carriage 32 moved to the left direction is abutted with the carriage abutting part 55b, the gap of the magnetic head 7 is located on a left side with respect to a left end of a card 2 and the magnetic head 7 has begun to retreat toward a retreated position. In other words, the left side face of the carriage 32 moved to the left direction is abutted with the carriage abutting part 55b after the gap of the magnetic head 7 is separated from the card 2 and the magnetic head 7 has begun to retreat toward the retreated position.

As shown in FIGS. 6(A) and 6(B), when the shutter member 14 has closed the opening part 13, a front end of the shutter member 14 is disposed to a lower side of the guide part 29a of the guide member 29. Specifically, when the shutter member 14 has closed the opening part 13, the front end of the shutter member 14 is disposed under the guide part 29a. Further, as shown in FIG. 6(C), when the shutter member 14 has opened the opening part 13, the shutter member 14 is disposed under the guide part 29a. Specifically, when the shutter member 14 has opened the opening part 13, the entire shutter member 14 is disposed under the guide part 29a. In other words, when the shutter member 14 has opened the opening part 13, the front end and the rear end of the shutter member 14 are disposed under the guide part 29a.

In a case that the shutter member 14 has closed the opening part 13 and, in addition, that a card 2 does not abut with the card abutting part 50a of the positioning member 50, as shown in FIG. 6(A), a part on a front upper end side of the card support part 50b of the positioning member 50 is located in the cut-out part 14a of the shutter member 14 and, when viewed in the right and left direction, a part of an inclined face on the front upper end side of the card support part 50b is overlapped with the shutter member 14. Therefore, a rear end of a card 2 can be guided to the card support part 50b by the shutter member 14 having closed the opening part 13.

In this embodiment, in a case that the shutter member 14 has closed the opening part 13 and, in addition, that a card 2 is abutted with the card abutting part 50a and the card 2 is positioned in the front and rear direction, a rear end of the shutter member 14 is located on a slightly upper side relative to a boundary portion between the card abutting part 50a and the card support part 50b. Further, when a card 2 is abutted with the card abutting part 50a and the card 2 is positioned in the front and rear direction, the boundary portion between the card abutting part 50a and the card support part 50b is located at a substantially same position as an upper face of the guide part 29a in the upper and lower direction.

In both cases that the shutter member 14 has closed the opening part 13, and that the shutter member 14 has opened the opening part 13, the entire lever members 58 are located under at least one of the shutter member 14 and the guide part 29a. Further, in both cases that the shutter member 14 has closed the opening part 13, and that the shutter member 14 has opened the opening part 13, the holding part 56a of the holding member 56 and the slide part 55a of the slide member 55 are disposed under the guide part 29a.

(Schematic Operation of Card Reader)

In the card reader 1 structured as described above, in a standby state before a card 2 is inserted into the insertion port 3, as shown in FIG. 6(A), the shutter member 14 has closed the opening part 13. Further, in this standby state, the carriage 32 is located at a standby position on a left side with respect to the conveying passage 5 where the magnetic head 7 and the carriage 32 stand by. In this state, when it is detected that a card 2 has been inserted into the insertion port 3, the motor 27 is activated and the card 2 is conveyed to a rear side by the card conveying mechanism 6. When a rear end of the card 2 is abutted with the card abutting part 50*a* of the positioning member 50 as shown in FIG. 6(B), light from a light emitting element to a light receiving element of the sensor 51 is intercepted by the light intercepting part 50*d* and it is detected that the card 2 is positioned in the front and rear direction.

When it is detected that the card 2 has been positioned, the motor 27 is stopped. After that, the motor 43 is activated and the carriage 32 located at the standby position is moved to the right direction and, as described above, the shutter member 14 opens the opening part 13. Further, as shown in FIG. 6(C), the magnetic head 7 is moved to the right direction while abutting with the magnetic stripe 2*a* of the card 2 and, after that, the magnetic head 7 is moved to the left direction and, in this manner, reading and recording of magnetic data are performed. Further, the carriage 32 is moved to the left direction toward the standby position and, as described above, the shutter member 14 closes the opening part 13.

(Principal Effects in this Embodiment)

As described above, in this embodiment, the positioning member 50 is provided with the card abutting part 50*a* structured to abut with a rear end of a card 2 having been taken into the card reader 1, and the card support part 50*b* which is capable of contacting with an under face of the card 2 when the rear end of the card 2 is abutted with the card abutting part 50*a*. When the rear end of the card 2 is abutted with the card abutting part 50*a*, the card 2 is positioned in the front and rear direction. Further, in this embodiment, the rear end of the card 2 can be guided to the card support part 50*b* by the shutter member 14 having closed the opening part 13. Therefore, according to this embodiment, as shown in FIGS. 10(A) and 10(B), even in a case that a card 2 whose both ends in a short-side direction of the card 2 are curved to a lower side (hereinafter, the curved card 2 is referred to as a "card 2A") is inserted into the card reader 1, when the card 2A is positioned, a rear end of the card 2A can be supported by the card support part 50*b*.

In this embodiment, when a rear end of a card 2 is abutted with the card abutting part 50*a* and the card 2 is positioned, a distance "L" in the front and rear direction between the card abutting part 50*a* and a rear end of the guide part 29*a* of the guide member 29 is set to be shorter than a width "W2" in a short-side direction of a card 2 and, in addition, when the shutter member 14 has closed the opening part 13, a front end of the shutter member 14 is disposed under the guide part 29*a*. Therefore, according to this embodiment, even in a case that a card 2A is inserted into the card reader 1, when the card 2A is positioned, a front end of the card 2A can be supported by the guide part 29*a*.

As described above, in this embodiment, even in a case that a card 2A is inserted into the card reader 1, when the card 2A is positioned, as shown in FIGS. 10(A) and 10(B), a rear end of the card 2A can be supported by the card support part 50*b* and a front end of the card 2A can be supported by the guide part 29*a*. Further, in this embodiment, when the shutter member 14 has opened the opening part 13, the entire shutter member 14 is disposed under the guide part 29*a*. Therefore, in a case that a position of the shutter member 14 when the opening part 13 is closed is referred to as a closing position (see FIG. 10(A)) and a position of the shutter member 14 when the opening part 13 is opened is referred to as an open position (see FIG. 10(B)), when the shutter member 14 located at the closing position is to be moved toward the open position after the card 2A is positioned, the rear end side and the front end side of the card 2A can be prevented from contacting with the shutter member 14 or, even when the rear end side of the card 2A is contacted with the shutter member 14, the contact pressure can be reduced. Further, in a case that the shutter member 14 located at the open position is to be moved to the closing position in a state that the card 2A is positioned, the rear end side and the front end side of the card 2A can be prevented from contacting with the shutter member 14 or, even when the rear end side of the card 2A is contacted with the shutter member 14, the contact pressure can be reduced. Therefore, according to this embodiment, in a case that the shutter member 14 is moved between the closing position and the open position, a load to the shutter member 14 due to contact pressure of the card 2A can be reduced. As a result, in this embodiment, even when the opening part 13 for passing the magnetic head 7 moved in the right and left direction is formed in the conveying passage 5, the shutter member 14 can be moved smoothly.

In this embodiment, the shutter member 14 which has closed the opening part 13 is slightly inclined so as to go upward toward a rear side with respect to the "XY" plane. Therefore, according to this embodiment, when the card 2A is inserted into the card reader 1, a rear end of the card 2A can be surely guided to the card support part 50*b*.

In this embodiment, the shutter member 14 opens the opening part 13 by an urging force of the tension coil spring 57 and the shutter member 14 closes the opening part 13 by a moving force of the magnetic head 7 which is moved to the left direction. Therefore, according to this embodiment, another drive source for operating the shutter member 14 is not required to provide separately. Accordingly, in this embodiment, a structure of the card reader 1 can be simplified.

In this embodiment, the left side face of the carriage 32 which is moved to the left direction is abutted with the carriage abutting part 55*b* after a gap of the magnetic head 7 has passed through a magnetic data recorded area of the magnetic stripe 2*a*. Therefore, according to this embodiment, even when the shutter member 14 is moved from the open position to the closing position by using power of the head moving mechanism 8, lowering of reading accuracy and recording accuracy of magnetic data by the magnetic head 7 can be prevented.

In this embodiment, the shutter member 14 and the lever members 58 are formed in a flat plate shape and are disposed so that their thickness directions are substantially coincided with the upper and lower direction. Further, in this embodiment, the holding part 56*a* of the holding member 56 and the slide part 55*a* of the slide member 55 are formed in a flat plate shape and are disposed so that their thickness directions are substantially coincided with the upper and lower direction. Therefore, according to this embodiment, the sizes of the shutter member 14 and the shutter operation mechanism 15 can be reduced in the upper and lower direction and, as a result, the size of the card reader 1 can be reduced in the upper and lower direction.

In this embodiment, a width of the opening part 13 in the right and left direction is set to be wider than a width "W1" in a longitudinal direction of a card 2. Therefore, according to this embodiment, when the magnetic head 7 moved from the retreated position to the head abutting position is to be abutted with the magnetic stripe 2*a*, behavior of the magnetic head 7 such as a moving speed of the magnetic head 7 can be stabilized. Accordingly, in this embodiment, reading accuracy and recording accuracy of magnetic data by the magnetic head 7 can be secured. Further, in this embodiment, the width "W10" in the right and left direction of the shutter member 14 is set to be wider than the width "W1" in the longitudinal direction of a card 2 and thus, even when the width of the opening part 13 in the right and left direction is set to be wider, entering of foreign matters and dust through the opening part 13 can be prevented by the shutter member 14.

OTHER EMBODIMENTS

Although at least an embodiment of the present invention has been shown and described with reference to a specific embodiment, various changes and modifications will be apparent to those skilled in the art from the teachings herein.

In the embodiment described above, in a case that the shutter member 14 has closed the opening part 13 and, in addition, that a card 2 is abutted with the card abutting part 50a and the card 2 is positioned in the front and rear direction, a rear end of the shutter member 14 is located on a slightly upper side relative to a boundary portion between the card abutting part 50a and the card support part 50b. However, the present invention is not limited to this embodiment. For example, in a case that the shutter member 14 has closed the opening part 13 and, in addition, that a card 2 is abutted with the card abutting part 50a and the card 2 is positioned in the front and rear direction, a rear end of the shutter member 14 may be located at the same position as a boundary portion between the card abutting part 50a and the card support part 50b in the upper and lower direction. Alternatively, a rear end of the shutter member 14 may be located on a lower side relative to a boundary portion between the card abutting part 50a and the card support part 50b. In this case, when a card 2A is inserted into the card reader 1 and is positioned, a rear end of the card 2A can be supported by the card support part 50b so that a rear end side of the card 2A is not contacted with the shutter member 14.

In the embodiment described above, the shutter member 14 opens the opening part 13 by an urging force of the tension coil spring 57, and the shutter member 14 closes the opening part 13 by a moving force of the magnetic head 7 moved to the left direction. However, the present invention is not limited to this embodiment. For example, it may be structured that the shutter member 14 opens the opening part 13 by a moving force of the magnetic head 7 moved to the right direction, and that the shutter member 14 closes the opening part 13 by an urging force of an urging member such as a tension coil spring. Further, in the embodiment described above, opening and closing by the shutter member 14 are performed by utilizing an urging force of the tension coil spring 57 and a moving force of the magnetic head 7. However, a drive source for opening and closing by the shutter member 14 may be provided.

In the embodiment described above, the shutter member 14 and the lever members 58 are slightly inclined so as to go upward toward a rear side with respect to the "XY" plane. However, the present invention is not limited to this embodiment. For example, the shutter member 14 and the lever members 58 may be arranged in parallel to the "XY" plane.

In the embodiment described above, the card 2 is a rectangular card made of vinyl chloride whose thickness is about 0.7-0.8 mm. However, the present invention is not limited to this embodiment. For example, the card 2 may be a PET (polyethylene terephthalate) card whose thickness is about 0.18-0.36 mm or may be a paper card having a predetermined thickness. Further, in the embodiment described above, a magnetic stripe 2a is formed on a rear face of the card 2 but, instead of the rear face of the card 2 or, in addition to the rear face of the card 2, a magnetic stripe may be formed on a front face 2b of a card 2. For example, a magnetic stripe in conformity with the standard of JISX6302 may be formed on a front face of a card 2. In a case that a magnetic stripe is formed only on a front face of a card 2, the magnetic head 7 is disposed to an upper side of the conveying passage 5. Further, in a case that a magnetic stripe is formed on a front face of a card 2 in addition to the magnetic stripe 2a, the magnetic head 7 is disposed to an upper side and to a lower side of the conveying passage 5.

In the embodiment described above, an optical type sensor for detecting a card 2 is disposed in the conveying passage 5. It may be detected by using the sensor whether the shutter member 14 has closed the opening part 13 or the shutter member 14 has opened the opening part 13.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A card reader in which a card formed in a substantially rectangular shape is conveyed in a short-side direction of the card and processed the card having a magnetic stripe, when one side in a thickness direction of the card conveyed in the card reader is referred to as a first direction, the other side in the thickness direction of the card is referred to as a second direction, a taking-in direction of the card to the card reader which is one side in a conveying direction of the card conveyed in the card reader is referred to as a third direction, and an ejecting direction of the card from the card reader which is the other side in the conveying direction of the card is referred to as a fourth direction, the card reader comprising:

a card conveying mechanism structured to convey the card;

a guide part which structures at least a part on a first direction side of the conveying passage where the card is conveyed;

a magnetic head structured to abut with the magnetic stripe from the first direction side and perform at least one of reading of magnetic data recorded on the card and recording of magnetic data to the card;

a head moving mechanism structured to move the magnetic head in a width direction of the conveying passage which is perpendicular to the conveying direction of the card;

a positioning member structured to position the card with respect to the magnetic head in the conveying direction of the card; and a shutter member structured to close an opening part which is formed on the first direction side of the conveying passage;

wherein the positioning member comprises:

a card abutting part structured to abut a third direction end of the card; and a card support part structured to contact with a first direction side of the card when the third direction end of the card is abutted with the card abutting part;

wherein when the third direction end of the card is abutted with the card abutting part, the card is positioned with respect to the magnetic head in the conveying direction of the card;

wherein the opening part is formed between the positioning member and the guide part in the conveying direction of the card and is formed so that the magnetic head moving in the width direction of the conveying passage is passed;

wherein a distance between the card abutting part and a third direction end of the guide part in the conveying direction of the card is set to be shorter than a width in the short-side direction of the card;

wherein when the shutter member has closed the opening part, a fourth direction end of the shutter member is disposed on a first direction side relative to the guide part in a thickness direction of the card;

wherein when the shutter member has opened the opening part, the shutter member is disposed on the first direction side relative to the guide part in the thickness direction of the card; and wherein the shutter member is structured such that, when the opening part is closed by the shutter member, the shutter member guides the third direction end of the card to the card support part.

2. The card reader according to claim 1, wherein the shutter member having closed the opening part is inclined with respect to the conveying direction of the card so as to go a second direction side toward the third direction.

3. The card reader according to claim 1, wherein the shutter member is structured to close or open the opening part by a moving force of the magnetic head which is moved in the width direction of the conveying passage.

4. The card reader according to claim 3, further comprising a shutter operation mechanism structured to operate the shutter member, wherein the head moving mechanism comprises a carriage on which the magnetic head is mounted and which is structured to move in the width direction of the conveying passage together with the magnetic head, wherein when one side in the width direction of the conveying passage is referred to as a fifth direction, and the other side in the width direction of the conveying passage is referred to as a sixth direction, the shutter operation mechanism comprises:

a slide member structured to linearly slide in the width direction of the conveying passage;

a holding member which slidably holds the slide member;

an urging member which urges the slide member to the sixth direction; and a lever member which is turnably held by the holding member and is relatively turnably connected with the shutter member and the slide member, wherein the slide member is formed with a carriage abutting part with which a side face on a fifth direction side of the carriage is capable of abutting, wherein when the carriage is located at a standby position where the carriage stands by on the fifth direction side relative to the conveying passage, the shutter member closes the opening part, wherein when the carriage located at the standby position is moved to the sixth direction, the slide member is slid to the sixth direction by an urging force of the urging member, and the lever member is turned and thereby the shutter member having closed the opening part opens the opening part, and wherein when the carriage is moved from a sixth direction side to the fifth direction toward the standby position, the carriage is abutted with the carriage abutting part, the slide member is slid to the fifth direction by power of the head moving mechanism and thereby the lever member is turned and the shutter member having opened the opening part closes the opening part.

5. The card reader according to claim 4, wherein when the carriage which is moved to the fifth direction is abutted with the carriage abutting part, a gap of the magnetic head is located on the fifth direction side relative to a magnetic data recorded area of the magnetic stripe.

6. The card reader according to claim 1, further comprising a shutter operation mechanism structured to operate the shutter member, wherein the shutter operation mechanism comprises:

a slide member structured to linearly slide in the width direction of the conveying passage;

a holding member which slidably holds the slide member; and a lever member which is turnably held by the holding member and is relatively turnably connected with the shutter member and the slide member, wherein the shutter member and the lever member are formed in a flat plate shape and are disposed so that their thickness directions and a thickness direction of the card are substantially coincided with each other.

7. The card reader according to claim 1, wherein a width of the opening part and a width of the shutter member in the width direction of the conveying passage are set to be wider than a width in a longitudinal direction of the card which is conveyed in the card reader.

* * * * *